Dec. 13, 1938.  V. GUTMANN  2,140,356

SUBMERSIBLE PUMP SET SEAL

Filed June 26, 1936

WITNESSES:
Michael Stark
Wm. C. Groome

INVENTOR
Victor Gutmann.
BY Paul E. Friedemann
ATTORNEY

Patented Dec. 13, 1938

2,140,356

UNITED STATES PATENT OFFICE 2,140,356

SUBMERSIBLE PUMP SET SEAL

Victor Gutmann, Nuremburg, Germany, assignor to Westinghouse Electric & Manufacturing Company, East Pittsburgh, Pa., a corporation of Pennsylvania Application June 26, 1936, Serial No. 87,355
In Germany September 6, 1935

4 Claims. (Cl. 286—7)

My invention relates to accessories for bearings, more particularly to improvements relating to the stuffing boxes between a pump and its driving motor of a submersible pump set.

One object of my invention is to prevent the flow of liquid from one side of a stuffing box to the other side of such box when the shaft with which the stuffing box is associated is at rest.

A broader object of my invention is to provide a positive seal at a bearing for a shaft to prevent a flow of fluid from one side of the bearing to the other side of the bearing.

Another object of my invention is to completely prevent the entry of water into the motor chamber of a submersible pump set including an electric motor and a pump driven thereby.

Figure 1:
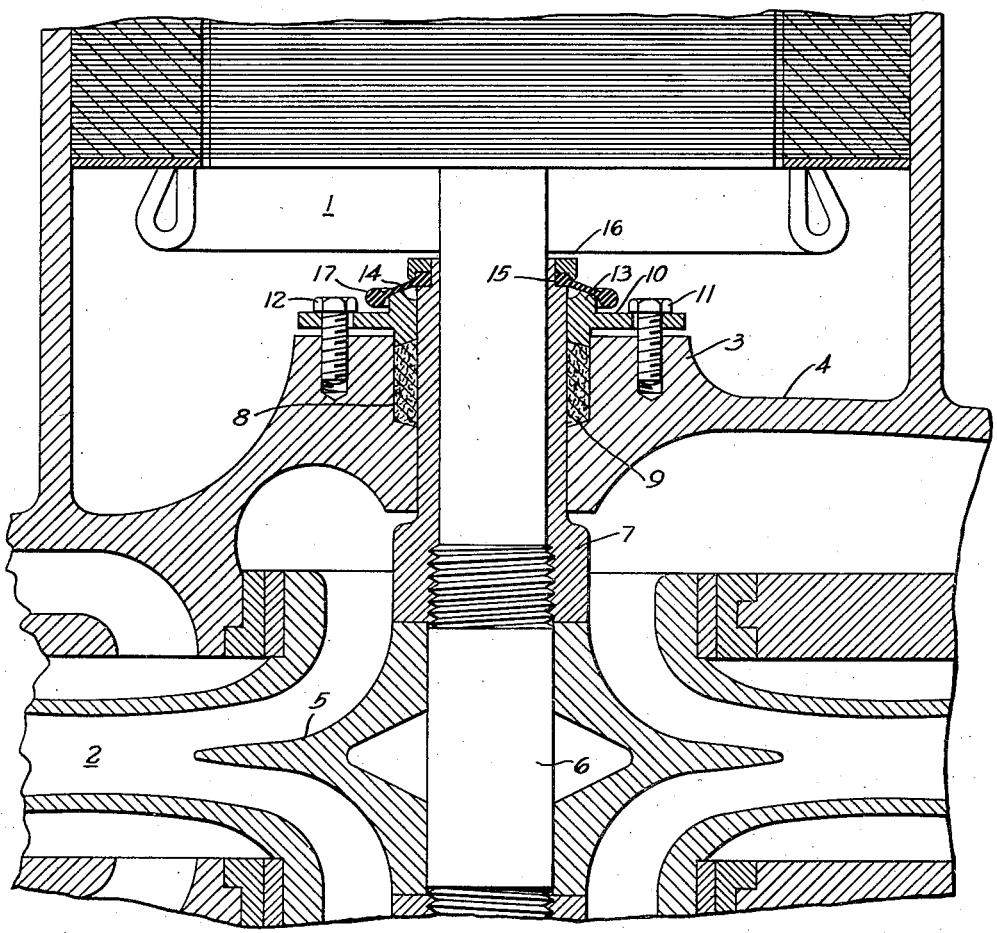
Figure 2:
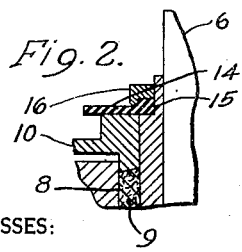
Figure 3:
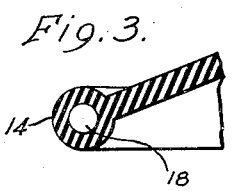

Other objects and advantages will become more apparent from a study of the following specification when considered in conjunction with the accompanying drawing, in which Figure 1 shows a longitudinal sectional view of my invention associated with the motor shaft shown continuous with the pump shaft, and Figs. 2 and 3 are modifications of my invention showing a different structure which I may use for accomplishing the novel results of my invention.

To accomplish the novel results hereinbefore generally stated in the objects and more extensively stated in the claims appended to this specification, I provide an annular rubber member, or washer made of similar material, with the conventional stuffing box. This annular member, or washer, is constructed of resilient material and normally by reason of its resiliency and design firmly engages a seating surface, but moves away from such seating surface when rotated about its center by reason of the centrifugal forces acting on it to deform it.

In the drawing, the reference character I generally designates the motor and 2 generally designates the pump driven by the motor. The bearing support for the bearing 3 and the wall between the pump and the motor are generally indicated by reference character 4.

The rotating portion 5 of the pump is rigidly secured to the shaft 6 and a bearing sleeve 7 is also rigidly secured to the shaft 6. This sleeve 7 extends through the wall 4 to the motor side of the wall and coacts with a conventional stuffing box 8. The stuffing material 9 is placed under pressure by the gland, or follower 10 moved longitudinally of the sleeve 7 by the bolts 11 and 12. The motor side of the gland 10 is provided with a seating surface 13 for receiving the liquid sealing surface of the washer 14.

This washer 14 is constructed to have the general shape of a conical annulus or the general shape of an annulus formed from a section of a hollow ball. The washer is thus either funnel-shaped or dish-shaped. The rubber washer may, of course, have any other shape as long as it is designed to firmly engage the seating surface 13 to prevent fluid, more particularly, liquid, from leaking into the motor chamber.

The washer, at its inner periphery, is provided with a thickened portion 15 which is preferably square in section. The thickened portion could have other sectional shapes as circular, rectangular, etc. The thickened portion 15 is firmly held on the sleeve 7 by means of the ring 16 which may be threaded on the upper end of the sleeve or the ring may be fixed to the sleeve by a press fit. Since the sleeve 7 is fixed to the shaft 6 it is clear that the washer 14 will be caused to rotate with the shaft 6 when the motor operates the pump.

The outer portion of the washer is provided with a resilient relatively heavy bead 17. When the motor operates the pump the centrifugal force causes the bead to swing outwardly. That is, operation of the motor shaft causes the washer 14 to take a shape so that substantially all parts of it fall in a plane perpendicular to the motor shaft. The washer thus makes no contact with the seating surface 13 and therefore is not subject to wear. As soon as the motor is stopped, however, the spring effect of the washer causes it to positively seal the motor chamber so that liquid from the pump chamber cannot enter the motor chamber.

Not only is wear of the washer 14 prevented by the construction shown but also no braking effect is produced on the shaft by the washer during operation because the seating surface of the washer and the seating surface of the ring, or gland 10 are not in engagement.

To keep the size of the bead small and to nevertheless get necessary disengagement between the seating surface 13 and the washer the bead may be made of material of a high specific gravity, or iron or lead wire or ball inserts may be placed in the bead as generally indicated in Fig. 3. The ball insert 18 may be lead or iron or any other relatively heavy material.

It is not essential that the washer 14, when in place, be conical-shaped or arcuate-shaped. The washer may be a rubber disk or ring, or a disk or ring of some other resilient material, falling, when in place, in a plane perpendicular to the motor axis, as shown in Fig. 2. The centrifugal force will cause the disk to stretch and in so doing its thickness decreases and the result is that the washer is disengaged from the seating surface 13. Whether or not the washer, as shown in Fig. 2, is provided with a bead or inserts in the bead will, of course, be determined by the needs of the apparatus. High speed apparatus will usually require less weight in the outer portion of the washer than low speed apparatus.

I do not wish to be restricted to the specific structural details or arrangement of parts herein set forth as various other modifications thereof may be effected without departing from the spirit and scope of my invention. I desire, therefore, that only such limitations shall be imposed as are indicated in the appended claims.

I claim as my invention:

1. In combination with a shaft that may be rotated, an inherently resilient washer of concave shape surrounding the shaft and secured to the shaft by a liquid tight connection so that no liquid can flow along the shaft past the connection and so that the resilient washer rotates with the shaft, a stuffing box surrounding the shaft, packing material in the box, an annular follower surrounding the shaft adapted to place the packing material under compression, said follower having a washer engaging surface at one end thereof remote from the packing material, said washer being disposed on the shaft with the concavity toward the washer engaging surface to thus resiliently engage the washer engaging surface of the follower when the shaft is at rest, and means, mounted on the washer and at the periphery thereof to be responsive to the centrifugal forces produced in the washer by rotation of the shaft, adapted to distort the washer so that it moves out of engagement with the washer engaging surface on the follower.

2. In combination with a shaft that may be rotated, a resilient washer, generally the shape of the outer, or concave, regions of a dish, surrounding the shaft and affixed to the shaft by a liquid tight connection so that liquid cannot flow along the shaft past the connection and so that the washer rotates with the shaft, a stuffing box surrounding the shaft, packing material in the box, an annular follower surrounding the shaft adapted to place the packing material under compression, said follower having a washer engaging surface at the side thereof remote from the packing material, said washer being disposed on the shaft with the concavity toward the washer engaging surface on the follower to thus resiliently engage the washer engaging surface when the shaft is not rotating, said washer being sufficiently resilient, or pliable so that the centrifugal forces set up in the washer, when the shaft and thus the washer is rotating above a predetermined speed will distort the washer by an extent sufficient to cause the washer to disengage the washer engaging surface on the follower.

3. In combination with a shaft that may be rotated, an inherently resilient washer of concave shape surrounding the shaft and secured to the shaft by a liquid tight connection so that no liquid can flow along the shaft past the connection and so that the resilient washer rotates with the shaft, a stuffing box surrounding the shaft, packing material in the box, an annular follower surrounding the shaft adapted to place the packing material under compression, said follower having a washer engaging surface at the side thereof remote from the packing material, said washer being disposed on the shaft with the concavity toward the washer engaging surface to thus resiliently engage the engaging surface of the follower when the shaft is at rest, and said washer having weights mounted in the periphery thereof whereby all the elements of the washer, upon rotation of the shaft and thus the washer, are, by the centrifugal forces set up in the washer itself and by the effect of the weights, caused to fall more nearly in a plane perpendicular to the shaft to thus move the washer out of engagement with the washer engaging surface on the follower.

4. In combination with a shaft, a bearing and bearing housing for the shaft, a member secured to the bearing housing and having a fluid tight connection with the housing, a washer seating surface on the member disposed on the side of the member remote from the bearing housing, and a resilient washer surrounding the shaft and secured thereto by a fluid tight connection, said washer having a plurality of weights mounted thereon at the peripheral region, being inherently resilient, and having a concave shape with the concavity thereof disposed toward the washer seating surface of the member to thus normally resiliently engage the washer seating surface but, being connected to the shaft, is adapted to be distorted by centrifugal forces, upon rotation of the shaft, to cause said washer to move away from the washer seating surface.

VICTOR GUTMANN.